United States Patent
Sugiura

(10) Patent No.: US 9,027,670 B2
(45) Date of Patent: May 12, 2015

(54) DRILLING SPEED AND DEPTH COMPUTATION FOR DOWNHOLE TOOLS

(75) Inventor: Junichi Sugiura, Bristol (GB)

(73) Assignee: Schlumberger Technology Corporation, Sugar Land, TX (US)

(*) Notice: Subject to any disclaimer, the term of this patent is extended or adjusted under 35 U.S.C. 154(b) by 478 days.

(21) Appl. No.: 13/530,084

(22) Filed: Jun. 21, 2012

(65) Prior Publication Data

US 2013/0341091 A1    Dec. 26, 2013

(51) Int. Cl.
| | |
|---|---|
| E21B 44/00 | (2006.01) |
| E21B 45/00 | (2006.01) |
| E21B 7/04 | (2006.01) |
| E21B 47/00 | (2012.01) |
| G05B 15/02 | (2006.01) |

(52) U.S. Cl.
CPC . *E21B 44/00* (2013.01); *E21B 7/04* (2013.01); *E21B 47/00* (2013.01); *G05B 15/02* (2013.01)

(58) Field of Classification Search
USPC .................. 175/24, 40, 45; 702/9; 73/152.44
See application file for complete search history.

(56) References Cited

U.S. PATENT DOCUMENTS

| | | | |
|---|---|---|---|
| 5,321,982 A | 6/1994 | Fay et al. | |
| 5,341,886 A | 8/1994 | Patton | |
| 5,398,546 A | 3/1995 | Jeffryes | |
| 5,522,260 A | 6/1996 | Chappellat et al. | |
| 5,896,939 A | 4/1999 | Witte | |
| 6,769,497 B2 | 8/2004 | Dubinsky et al. | |
| 7,055,601 B2 | 6/2006 | Barrow | |
| 7,295,926 B2 | 11/2007 | Jeffryes | |
| 7,363,988 B2 | 4/2008 | Jeffryes | |
| 2001/0046042 A1 | 11/2001 | Theile et al. | |
| 2008/0083564 A1 | 4/2008 | Collins | |
| 2009/0090555 A1 | 4/2009 | Boone et al. | |
| 2011/0174541 A1 | 7/2011 | Strachan et al. | |
| 2012/0069713 A1 | 3/2012 | Geerits et al. | |
| 2013/0066557 A1* | 3/2013 | Forgang ............................ 702/6 |
| 2013/0341091 A1* | 12/2013 | Sugiura ........................... 175/24 |

OTHER PUBLICATIONS

International Search Report for the equivalent PCT patent application No. PCT/US2013/041801 issued on Aug. 23, 2013.

* cited by examiner

*Primary Examiner* — Daniel P Stephenson
(74) *Attorney, Agent, or Firm* — Chadwick A. Sullivan; Wesley Noah

(57) ABSTRACT

A method for managing a drilling operation, including generating, by a first sensor and a second sensor of a bottom hole assembly (BHA), a first time based data log and a second time based data log, respectively, representing a borehole parameter along a drilling trajectory, determining, by a computer processor of the BHA and during the drilling operation, a time shift by comparing the first time based data log and the second time based data log, where offsetting the first and second time based data logs by the time shift maximizes a correlation factor of the first and second time based data logs, and determining, within a pre-determined time period from generating the first and second time based data logs, a drilling speed based on the time shift and a pre-determined distance between the first sensor and the second sensor.

20 Claims, 9 Drawing Sheets

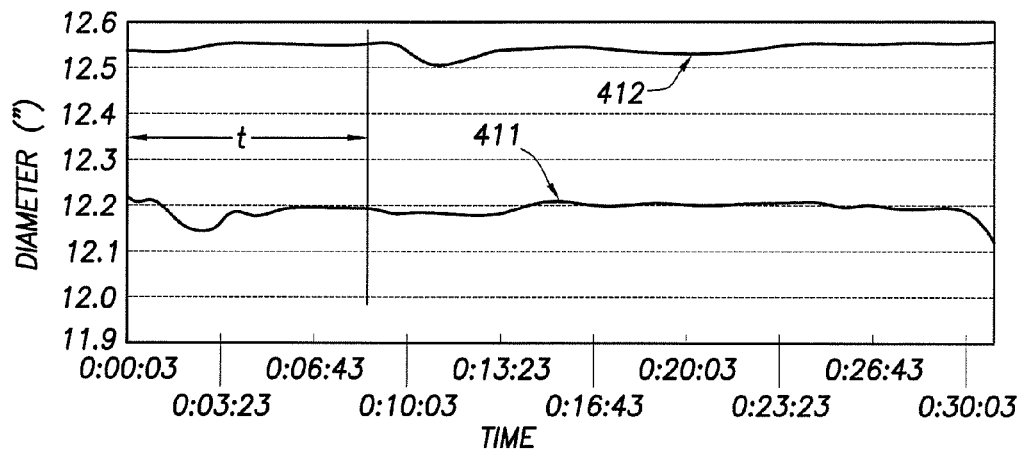
FIG.4.1
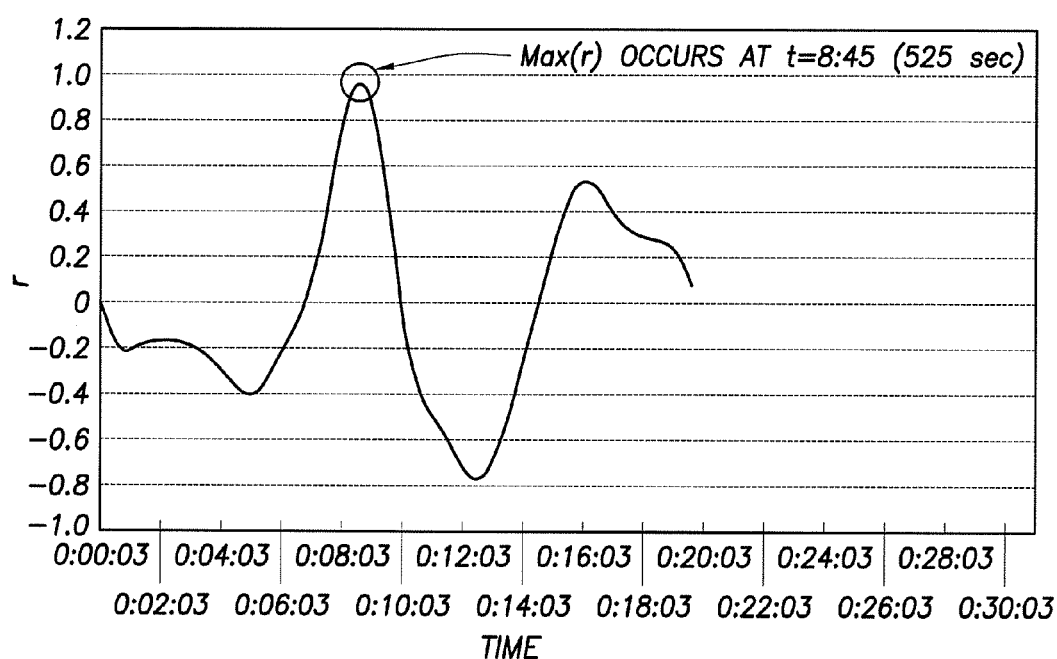
FIG.4.2

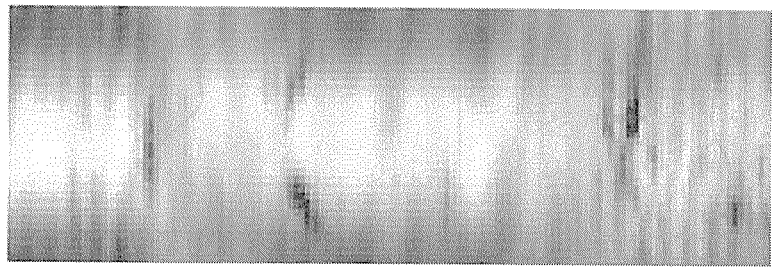
FIG.4.6
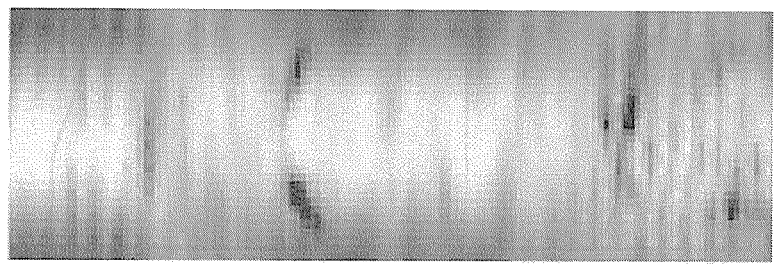
FIG.4.5
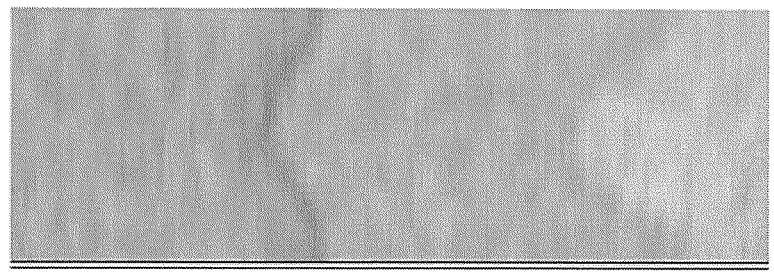
FIG.4.4
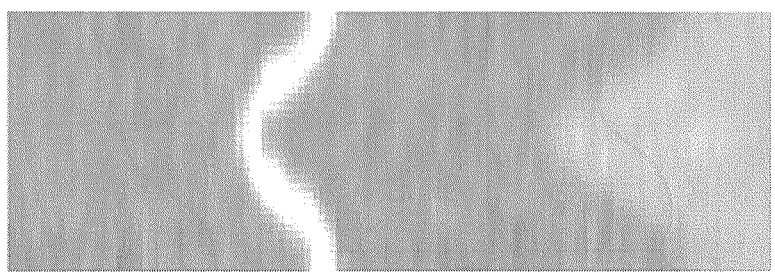
FIG.4.3

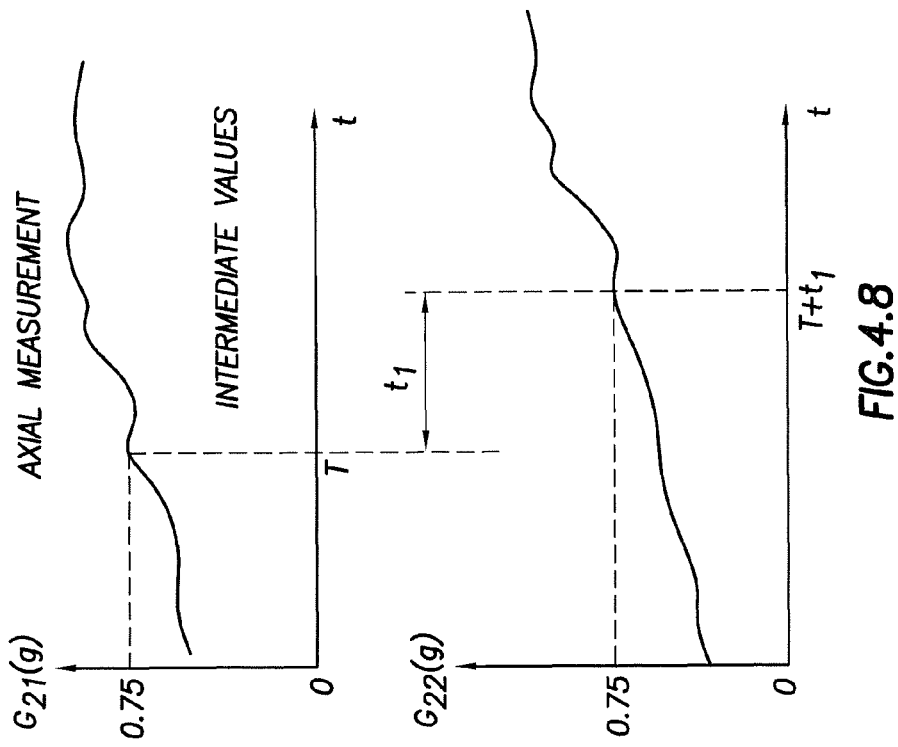
FIG.4.7
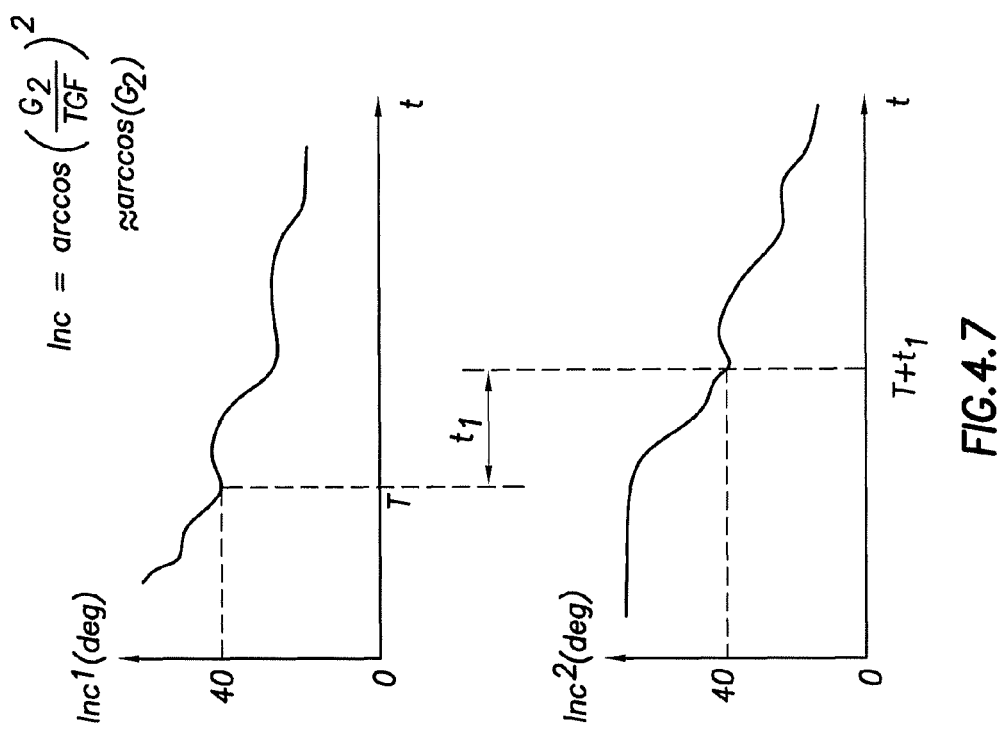
FIG.4.8

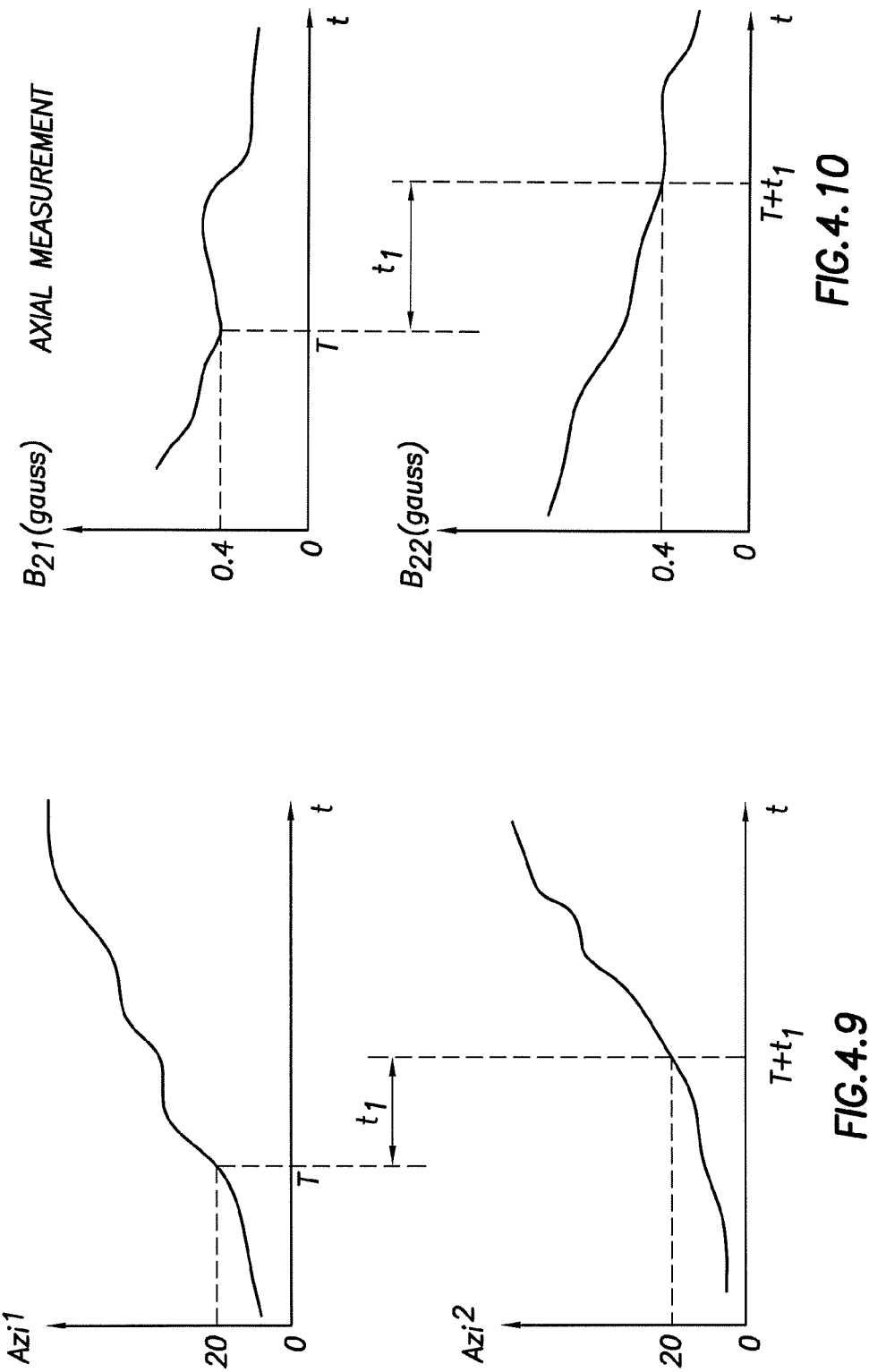

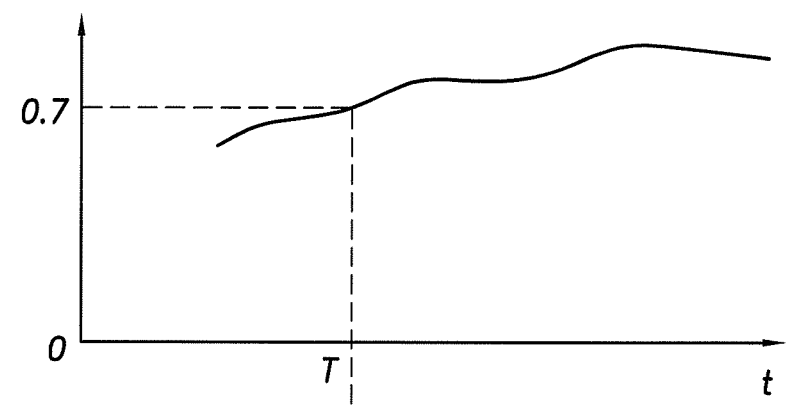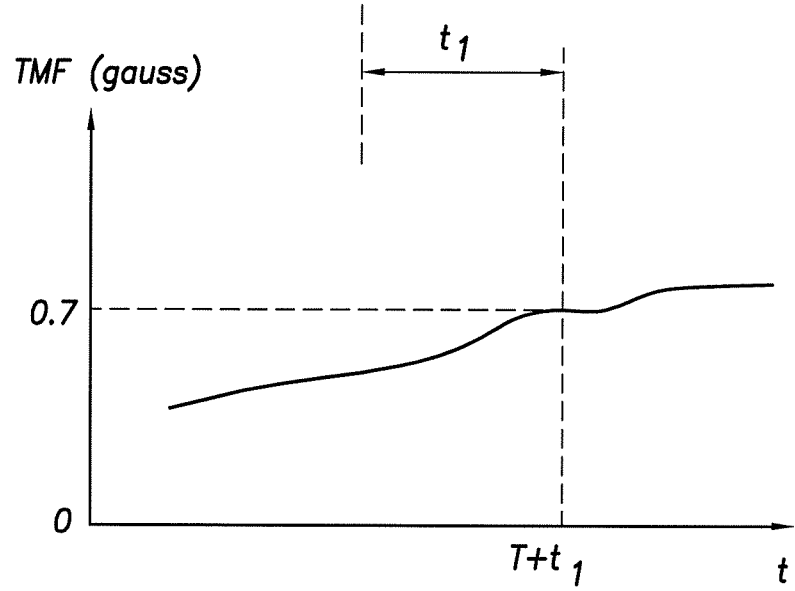
FIG.4.11

DRILLING SPEED AND DEPTH COMPUTATION FOR DOWNHOLE TOOLS

BACKGROUND

In various drilling and logging operations, it is desirable that the drilling speed or ROP (rate of penetration) is available to the downhole tools. Conventionally, ROP and measured depth are available only at the surface due to limited computational resources in downhole tools. Downhole ROP estimation methods based on downhole accelerometer data are available but not reliable due to harsh downhole conditions (e.g., shocks and vibrations). Furthermore, there is a trend in the industry towards drilling deeper wells with smaller diameters where downhole conditions become increasingly problematic.

SUMMARY

In general, in one aspect, the invention relates to a method for managing a drilling operation in a subterranean formation. The method includes generating, by a first sensor of a bottom hole assembly (BHA) and during the drilling operation, a first time based data log representing a borehole parameter along a drilling trajectory, generating, by a second sensor of the BHA during the drilling operation, a second time based data log representing the borehole parameter along the drilling trajectory, determining, by a computer processor of the BHA and during the drilling operation, a time shift by comparing the first time based data log and the second time based data log, wherein offsetting the first and second time based data logs by the time shift maximizes a correlation factor of the first and second time based data logs, determining, within a pre-determined time period from generating the first and second time based data logs, a drilling speed based on the time shift and a pre-determined distance between the first sensor and the second sensor, and performing the drilling operation based on the drilling speed.

Other aspects of the invention will be apparent from the following detailed description and the appended claims.

BRIEF DESCRIPTION OF DRAWINGS

The appended drawings illustrate several embodiments of drilling speed and depth computation for downhole tools and are not to be considered limiting of its scope, for drilling speed and depth computation for downhole tools may admit to other equally effective embodiments.

FIGS. 4.1-4.11 depict examples of drilling speed and depth computation for downhole tools in accordance with one or more embodiments.

DETAILED DESCRIPTION

Figure 1:
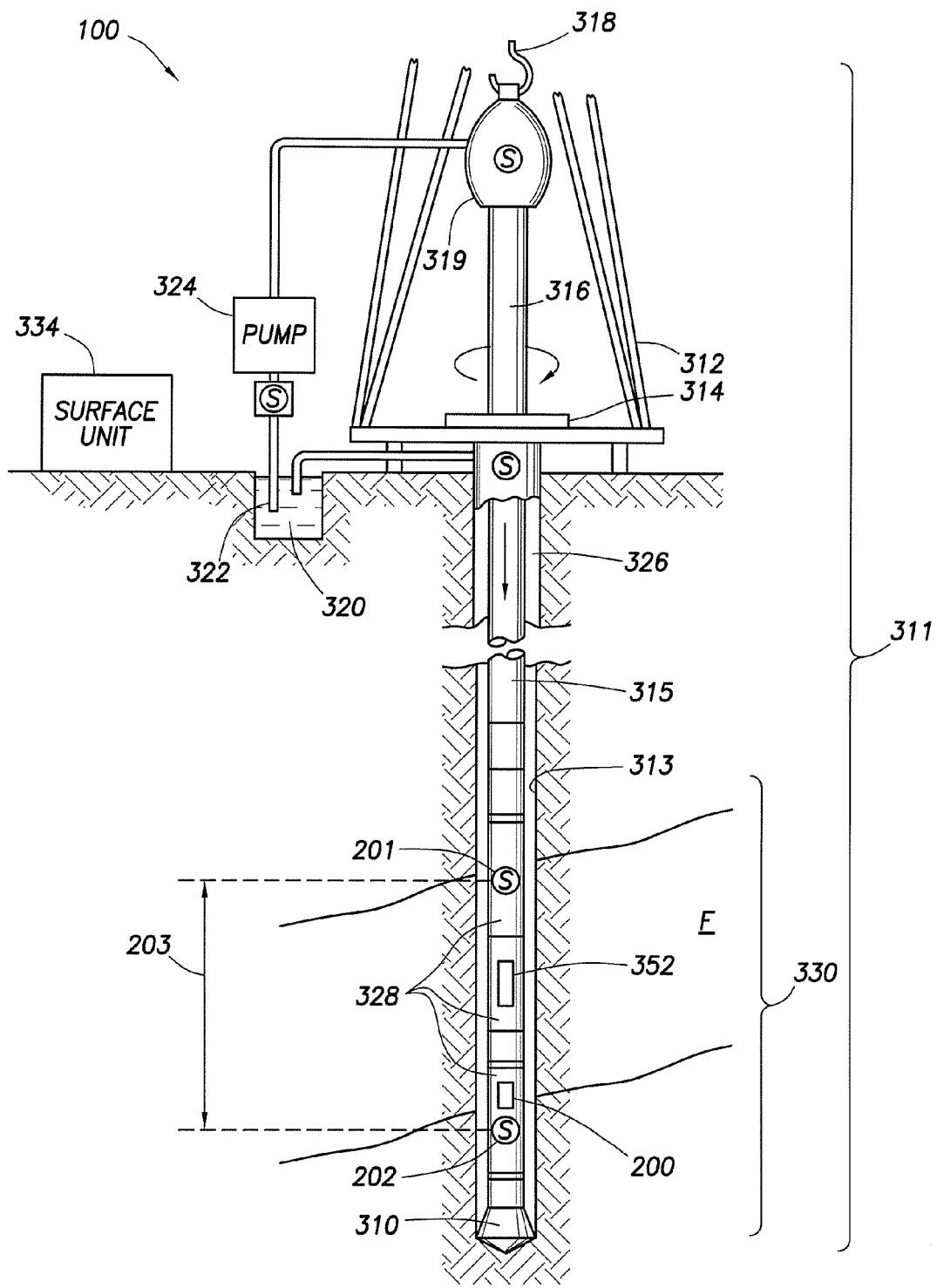
FIG. 1 is a schematic view of a wellsite depicting a drilling operation in which one or more embodiments of drilling speed and depth computation for downhole tools may be implemented.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium that address the aforementioned drawbacks of prior art ROP and depth estimation methods. In one or more embodiments, sensors of similar kind are placed at a known distance apart in a downhole bottom hole assembly (BHA) such that time based data logs collected at two different locations are compared to compute a time shift resulting in maximum correlation between the time-shifted data logs. Accordingly, near-instantaneous ROP and depth are calculated from the time shift and the known sensor separation distance.

FIG. 1 is a schematic view of a wellsite (100) depicting a drilling operation. The wellsite (100) includes a drilling system (311) and a surface unit (334). In the illustrated embodiment, a borehole (313) is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

The drilling system (311) includes a drill string (315) suspended within the borehole (313) with a drill bit (310) at its lower end. The drilling system (311) also includes the land-based platform and derrick assembly (312) positioned over the borehole (313) penetrating a subterranean formation (F). The assembly (312) includes a rotary table (314), kelly (316), hook (318) and rotary swivel (319). The drill string (315) is rotated by the rotary table (314), energized by means not shown, which engages the kelly (316) at the upper end of the drill string. The drill string (315) is suspended from hook (318), attached to a traveling block (also not shown), through the kelly (316) and a rotary swivel (319) which permits rotation of the drill string relative to the hook.

The drilling system (311) further includes drilling fluid or mud (320) stored in a pit (322) formed at the well site. A pump (324) delivers the drilling fluid (320) to the interior of the drill string (315) via a port in the swivel (319), inducing the drilling fluid to flow downwardly through the drill string (315) as indicated by the directional arrow. The drilling fluid (320) exits the drill string (315) via ports in the drill bit (310), and then circulates upwardly through the region between the outside of the drill string (315) and the wall of the borehole (313), called the annulus (326). In this manner, the drilling fluid (320) lubricates the drill bit (310) and carries formation cuttings up to the surface as it is returned to the pit (322) for recirculation.

The drill string (315) further includes the BHA (330), near the drill bit (310) (in other words, within several drill collar lengths from the drill bit). The BHA (330) includes capabilities for measuring, processing, and storing information, as well as communicating with the surface unit. The BHA (330) further includes drill collars (328) for performing various other measurement functions. In particular, the BHA (330) includes the drilling speed and depth computation tool (200).

Sensors (S) are located about the wellsite to collect data, may be in real time, concerning the operation of the wellsite, as well as conditions at the wellsite. The sensors (S) may also have features or capabilities, of monitors, such as cameras (not shown), to provide pictures of the operation. Surface sensors or gauges (S) may be deployed about the surface systems to provide information about the surface unit, such as standpipe pressure, hook load, depth, surface torque, rotary rpm, among others. Downhole sensors or gauges (S) are disposed about the drilling tool and/or wellbore to provide information about downhole conditions, such as wellbore pressure, weight on bit, torque on bit, direction, inclination, collar rpm, tool temperature, annular temperature and toolface, among others. Multiple downhole sensors (S) may be located at different positions on BHA (330), such as sensor (201) and sensor (202). The information collected by the sensors and cameras is conveyed to the various parts of the drilling system and/or the surface unit (334).

The drilling system (311) is operatively connected to the surface unit (334) for communication therewith. The BHA (330) is provided with a communication subassembly (352) that communicates with the surface unit. The communication subassembly (352) is adapted to send signals to and receive signals from the surface using mud pulse telemetry. The communication subassembly (352) may include, for example, a transmitter that generates a signal, such as an acoustic or electromagnetic signal, which is representative of the measured drilling parameters. It will be appreciated by one of skill in the art that a variety of telemetry systems may be employed, such as mud pulse telemetry, wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling or other operations are performed, the subsurface conditions may change. The earth model may also be adjusted as new information is collected.

For example, instantaneous ROP can be used to determine the proportional gain to use in a closed-loop drilling system so that automated trajectory control of a steerable drilling tool may become more precise during the drilling operation through different formations. Also, the drilled depth downhole (computed by integrating a drilling speed over a certain time period) can be used to compute the drilling trajectory downhole. Another useful application includes logging-while-drilling (LWD) imaging, where image recording intervals or telemetry intervals can be controlled, depending upon the drilling speed. Overall, the ability to compute ROP downhole dramatically improves the quality of downhole steering automation when used with, for example, rotary-steerable systems, coiled tubing system, and/or rotary-steerable motor tools.

Although the subterranean assets are not limited to hydrocarbons such as oil, throughout this document, the terms "oilfield" and "oilfield operation" may be used interchangeably with the terms "field" and "field operation" to refer to a site where any type of valuable fluids can be found and the activities required for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

Figure 2:
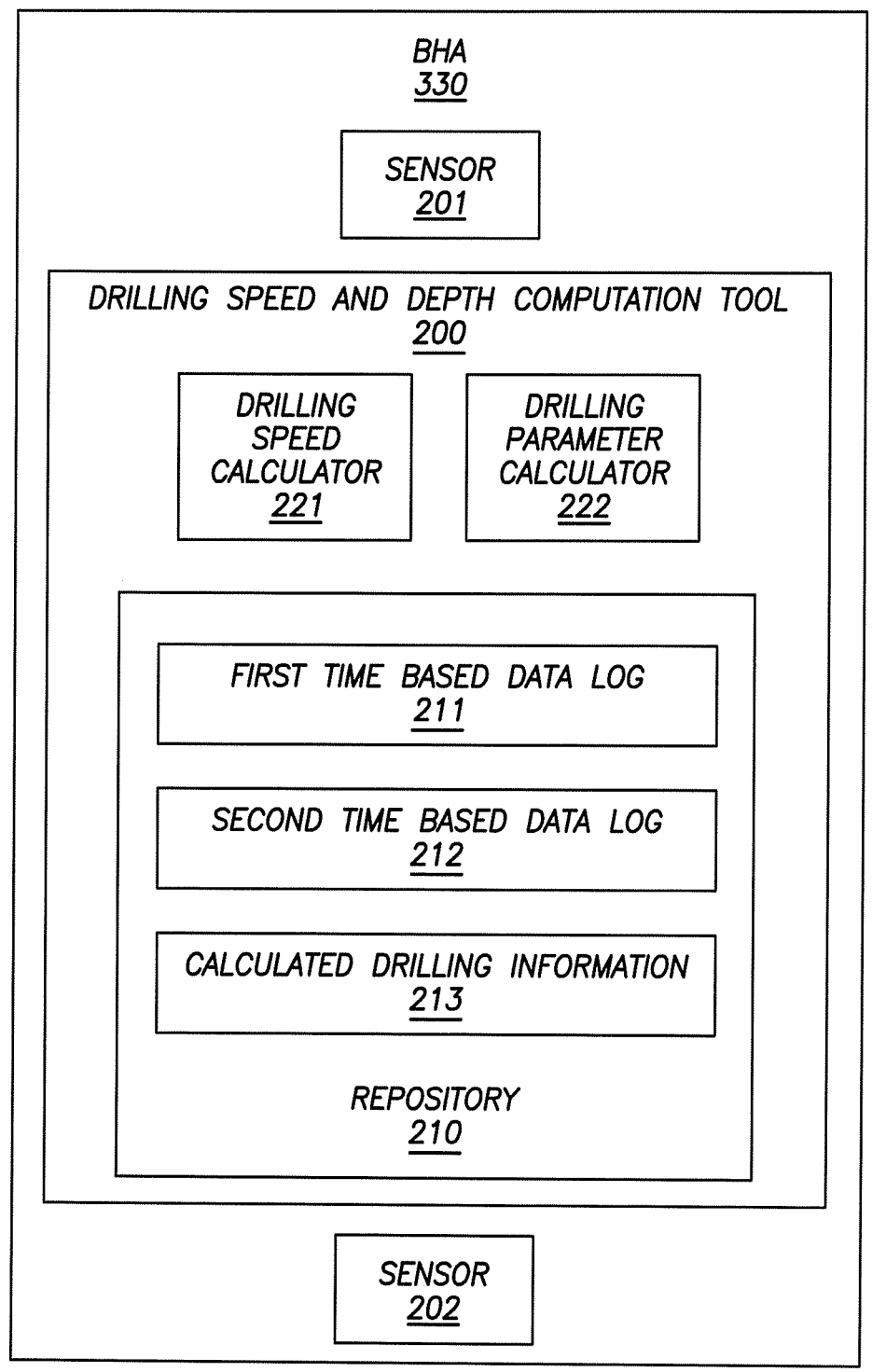
FIG. 2 shows a system for drilling speed and depth computation in accordance with one or more embodiments.

FIG. 2 is a schematic view of the BHA (330) with more details. In one or more embodiments of the invention, one or more of the modules and elements shown in FIG. 2 may be omitted, repeated, and/or substituted. Accordingly, embodiments of drilling speed and depth computation for downhole tools should not be considered limited to the specific arrangements of modules shown in FIG. 2.

As shown in FIG. 2, the BHA (330) includes a first sensor (201), a second sensor (202), and a drilling speed and depth computation tool (200). In one or more embodiments, the first sensor (201) is configured to generate, during a drilling operation, a first time based data log (211) representing a borehole parameter along a drilling trajectory that forms the borehole (313) of FIG. 1 above. Further, the second sensor (202) is configured to generate, during the drilling operation, a second time based data log (212) representing the borehole parameter along the drilling trajectory. For example, the borehole parameter may be a diameter of the borehole, a porosity of the formation rocks near the borehole, borehole inclination, total magnetic field, etc. In one or more embodiments, the first sensor (201) and the second sensor (202) are positioned at different locations on the BHA (330) and are separated by a distance (i.e., distance (203) shown in FIG. 1). In one or more embodiments, the first sensor (201) and the second sensor (202) are of a similar type. Throughout this disclosure, the term "similar type" or "similar kind" refers to at least one borehole parameter that can be measured by both the first sensor (201) and the second sensor (202). In particular, features in the borehole parameter profile along the borehole can be detected by both the first sensor (201) and the second sensor (202) such that the resultant data logs can be correlated between them. Specifically, the correlation is maximized when the resultant data logs are shifted with respect to each other, by a time shift on the time scale. As described later in reference to the drilling speed calculator (221), this time shift is used to calculate the drilling speed.

In one or more embodiments, the first sensor (201) and the second sensor (202) include imaging sensors. For example, the first sensor (201) may be a neutron imaging sensor while the second sensor (202) may be an acoustic imaging sensor. In another example, the first sensor (201) may be a mechanical caliper sensor while the second sensor (202) may be an acoustic caliper sensor. Although they are different types of sensors, they are of a similar type or a similar kind because they both can measure the borehole diameter and detect features (e.g., a protrusion of borehole surface) in the borehole diameter profile along the borehole.

In one or more embodiments, the first sensor (201) and the second sensor (202) include navigational sensors (e.g., accelerometers, magnetometers, gyros, etc.) and the resultant data logs include their navigational information (such as inclination, azimuth, total magnetic field, etc). In addition to the data logs, intermediate computational values from navigation sensors (i.e., the first sensor (201) and the second sensor (202)) may also be used to identify correlation. For example, axial accelerometer readings from the first sensor (201) and the second sensor (202) at two different axial locations (with a pre-determined axial offset) in the BHA (330) may be matched/correlated to determine the time shift between them to maximize the matching/correlation. The following formulae are well-known in the art:

Inclination=arc cos($G_z$/TGF), where TGF stands for total gravity field

Inclination=ar cos($G_z$), where TGF=1$G$(9.8 m/s$^2$)

Inclination=arc sin($G_{xy}$/TGF)

Inclination=arc sin($G_{xy}$), where TGF=1$G$(9.8 m/s$^2$)

$G_z$ is an axial accelerometer reading (e.g., as shown in FIG. 4.8). $G_{xy}$ is a transverse (cross-axial) accelerometer reading, computed using an equation $G_{xy}$=sqrt($G_x^2$+$G_y^2$), where sqrt( ) is a square root function. The axial accelerometer and/or transverse accelerometer readings may be used for both static survey operation and dynamic survey operation, whether the sensor (along with the drillstring) is rotating or not. In general, the static survey provides more accurate data but requires logistic planning in stopping the drilling operation. One or more filters (e.g., average filter, median filter, low-pass filter) known in the art may be applied to the axial and/or transverse accelerometer readings to minimize the noise effect from downhole vibration/shock when the data are taken during the drillstring rotation.

Likewise, axial and transverse magnetometer readings may also be used in a similar manner (e.g., as shown in FIG. 4.10). Generally, total magnetic field (TMF) may be used for drilling speed and depth computation (e.g., as shown in FIG. 4.11). TMF may be computed in the following equation. TMF=sqrt ($B_x^2+B_y^2+132$), where $B_x$, $B_y$, and $B_z$ are the x-, y- and z-axis magnetometer readings and sqrt( ) is a mathematical square-root function. In some areas, TMF changes with formation types (ferros or magnetic formation).

In other cases, especially in SAGD (steamed-assisted gravity drainage), a twin well is placed parallel to the first well, where casing magnetic interference are present while drilling. In this (SAGD) case, the magnetic interference magnitude (using TMF) and the interference magnetic field vector may uniquely change based on the axial position on the wellbore (e.g., as shown in FIG. 4.10). Two or more sets of magnetometers may be deployed and by matching/correlating their readings, downhole drilling speed and depth may be determined. Alternatively, the parameters, computed with triaxial magnetometers, such as magnetic dip angles and azimuth, may be equally used to match their data points since magnetometer data have magnetic interference, generating a particular signature at certain depth.

To give an example, in a J-well or a S-well, the first sensor (201) is a navigation sensor in an RSS (rotary steerable system) measuring particular inclination and azimuth. The second sensor (202) is another navigation sensor in an MWD tool (about 50-100 ft away) measuring same inclination and azimuth where the RSS previously passed. In practice, the borehole (313) is never a perfectly straight hole and this sensor combination is also applicable for any typical vertical well and/or horizontal well. FIGS. 4.7 and 4.9 show the use of inclination and azimuth of the borehole to determine the drilling speed. The azimuth of the well may be computed in the following equations well known in the art:

$$Azi1 = \arctan\left(\frac{(Gx1*By1 - Gy1*Bx1)*\sqrt{Gx1^2+Gy1^2+Gz1^2}}{Bz1*(Gx1^2+Gy1^2)-Gz1*(Gx1*Bx1-Gy1*By1)}\right)$$

Where $G_x$, $G_y$, and $G_z$ are the x-, y- and z-axis accelerometer readings respectively, and $B_x$, $B_y$, and $B_z$ are the x-, y- and z-axis magnetometer readings respectively. There are also alternative equations available to those who are skilled in the arts.

Suitable accelerometers for use in navigation sensors may be chosen from among substantially any suitable commercially available devices known in the art. For example, suitable accelerometers may include Part Number 979-0273-001 commercially available from Honeywell, and Part Number JA-5H175-1 commercially available from Japan Aviation Electronics Industry, Ltd. (JAE). Suitable accelerometers may alternatively include micro-electro-mechanical systems (MEMS) solid-state accelerometers, available, for example, from Analog Devices, Inc. (Norwood, Mass.). Such MEMS accelerometers may be advantageous for certain near bit sensor sub applications since they tend to be shock resistant, high-temperature rated, and inexpensive. Suitable magnetic field sensors may include conventional ring core flux gate magnetometers or conventional magneto-resistive sensors, for example, Part Number HMC-1021D, available from Honeywell.

In one or more embodiments, the first sensor (201) and the second sensor (202) further include a formation pressure senor, a downhole camera, and a temperature sensor. Additional example data logs of sensors of similar type are described in reference to FIGS. 4.1-4.6 below.

In one or more embodiments, the drilling speed and depth computation tool (200) includes a drilling speed calculator (221), a drilling parameter calculator (222), and a repository (210). In one or more embodiments, the repository (210) is a downhole memory module known to those skilled in the art. Specifically, the downhole memory has limited density and capacity due to harsh downhole conditions. In one or more embodiments, the repository (210) is configured to store the first time based data log (211), the second time based data log (212), and the calculated drilling information (213). Further, the repository (210) may be shared by the drilling speed and depth computation tool (200) and other downhole tools, such as LWD imaging tools (not shown) via a common communication bus (not shown). Several downhole computers may be used to process the sensor data and they may be connected in a common communication bus. The repository (210) may be located anywhere in the drill string (315), e.g., 10-100 ft away from the sensors (201) and (202). In one or more embodiments, the common communication bus may be hard-wired among different tools or include a partially EM (electromagnetic) shorthop or any other wireless communication bus, such as acoustic communication channels. Accordingly, the repository (210) may also be configured to store other data (not shown), such as LWD images generated by the LWD imaging tools.

In one or more embodiments, the drilling speed calculator (221) is configured to determine, during the drilling operation, a time shift by comparing the first time based data log (211) and the second time based data log (212). Specifically, the time shift is determined by offsetting the first time based data log (211) and the second time based data log (212), for instance, to maximize a correlation factor. The method for finding a match may utilize other methods than maximizing a correlation factor. Such methods include maximizing a cross-correlation, minimizing a regression error, etc. In this context, the term "correlation factor" may be used to refer to the, cross-correlation coefficient, an inverse of the regression error, etc. For example, if both sensors (201) and (202) can detect features in the borehole diameter profile, the time shift is determined by shifting (i.e., offsetting) the time scale of the first time based data log (211) against the second time based data log (212) to match respective peaks representing a protrusion in the borehole surface. Additional examples of determining the time shift are described in reference to FIGS. 4.1-4.6 below.

In one or more embodiments, the drilling speed calculator (221) is configured to determine, within a pre-determined time period from generating the first time based data log (211) and the second time based data log (212), a drilling speed based on the time shift and a pre-determined distance between the first sensor (201) and the second sensor (202). For example, the pre-determined distance may be the distance (203), shown in FIG. 1, while the drilling speed is calculated by dividing the distance (203) over the time shift. In one or more embodiments, the calculation is performed by a computer processor (not shown) on the BHA (330) without transmitting any data log to the surface and incurring transmission delays (e.g., of mud pulse telemetry). Accordingly, the pre-determined time period may be one second, one minute, or a time period substantially less than mud pulse telemetry transmission delay to the surface. In particular, calculating drilling speed within the pre-determined time period is referred to as calculating near-instantaneous drilling speed or calculating the drilling speed in real time. In one or more embodiments, the drilling speed calculator (221) is further configured to determine, within the pre-determined time period, a drilling depth by at least mathematically integrating the drilling speed over time.

In one or more embodiments, the drilling speed and depth computation tool (200) further includes a drilling parameter calculator (222) that is configured to calculate various drilling parameters and store them as calculated drilling information (213) in the repository (210). For example, the drilling parameter calculator (222) calculates, based on the drilling speed and within the pre-determined time period, parameters such as build rate, turn rate, dogleg, effective gravity toolface, etc. Accordingly, a toolface and/or a steering ratio can be adjusted, in real-time, based on at least one of these drilling parameters.

As is known to those skilled in the art, the toolface is the angle where the drill bit is pushing or pointing with respect to the earth's gravity field. In directional drilling applications, "toolface=0 degree" refers to the opposite side of the gravity field. If the tool's demand toolface is set to 0 degree, the tool is expected to perform pure build. Similarly, "toolface=90 degrees," "toolface=270 degrees," and "toolface=180 degrees" correspond to pure right turn, pure left turn, and pure drop, respectively. The steering ratio (SR) corresponds to how steep the curve is. For example, SR=0%, 50%, and 100% correspond to neutral drilling (no bias), 50% of the maximum curvature (or maximum degleg), and the maximum curvature (maximum dogleg), respectively. In general, by controlling the toolface and the steering ratio, a directional drilling system (e.g., a rotary steerable system, coiled-tubing system, rotary-steerable motor system, etc) can drill two and three-dimensional wells.

There are various rotary steerable systems (RSS) available in the market. Depending on the type of RSS, different control parameters (e.g., force vector toolface, pressure vector toolface, position vector toolface, force vector magnitude, pressure vector magnitude, position offset magnitude, eccentric distance, etc.) may be used that are equivalent to the aforementioned control parameters, toolface and steering ratio (or proportion).

In one or more embodiments, the drilling parameter calculator (222) is further configured to determine, during the drilling operation, constant depth intervals based on the drilling speed. Constant depth intervals are time intervals where the drill bit advances a constant depth during each of the intervals. In one or more embodiments, a downhole steerable device is adjusted to control a drilling trajectory periodically based on these constant depth intervals. For example, the downhole steerable device may include a proportional controller, a proportional integral controller, or a proportional integral differential controller that is adjusted once in each of the constant depth intervals. Said in other words, the controllers used to control the trajectory of the downhole steerable tool include, but not limited to, a proportional controller, a proportional integral controller, or a proportional integral differential controller. These controllers require certain gains such as proportional gain, integral gain, differential gain, etc. These gains may be adjusted (e.g., increased or decreased) based on the drilling speed computed downhole.

In one or more embodiments, the drilling parameter calculator (222) is further configured to determine, during the drilling operation, how often to store output of a downhole imaging tool in the repository (210) and/or how often to send output of a downhole imaging tool to the surface unit (334) via mud pulse telemetry. For example, when the drilling speed is slow, the images can be stored downhole or sent to surface less frequently to conserve limited downhole memory capacity and limited mud pulse telemetry bandwidth.

Additional examples of calculating the drilling speed and other drilling parameters are described in reference to FIGS. 4.1-4.6 below.

Figure 3:
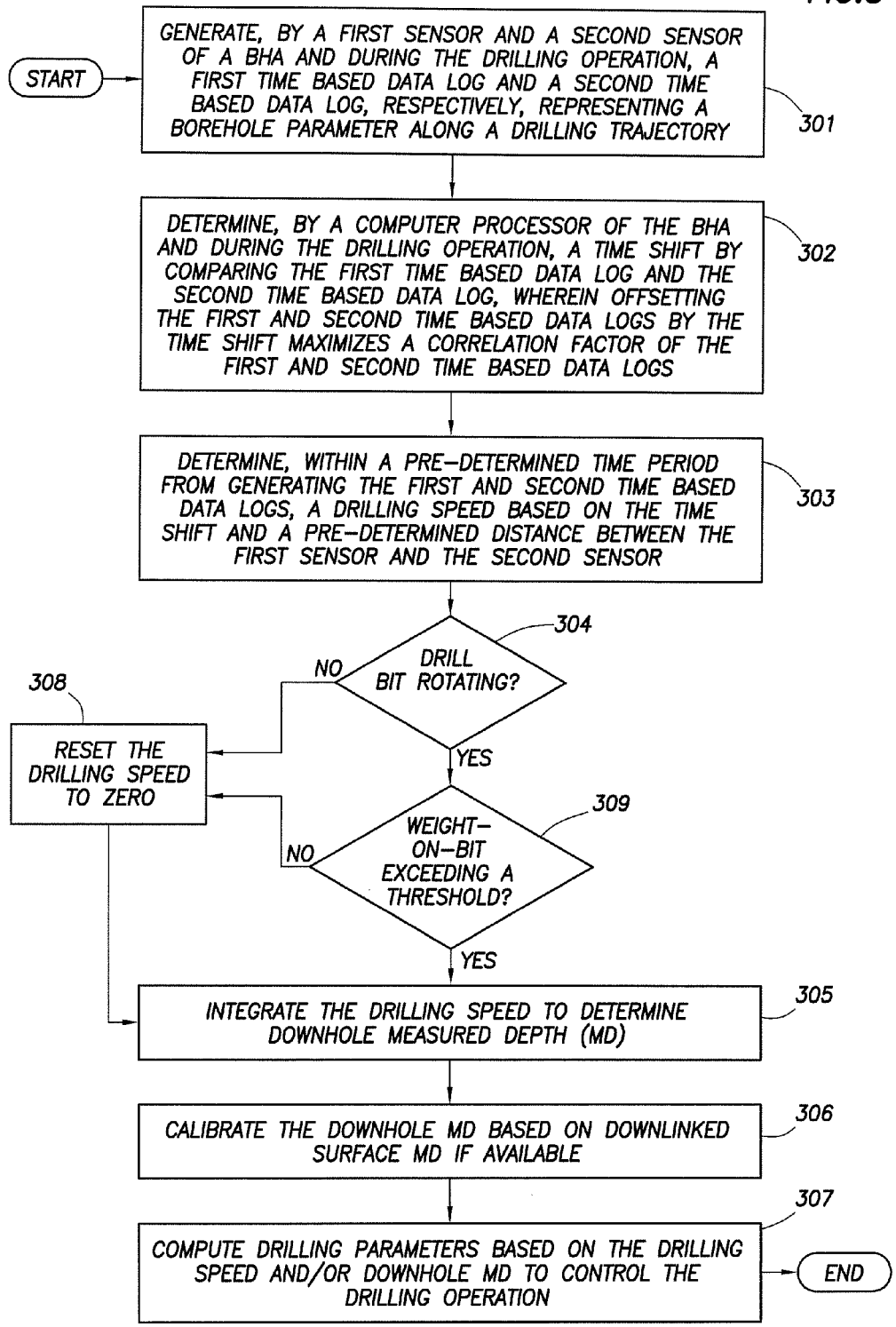
FIG. 3 depicts an example flowchart of drilling speed and depth computation for downhole tools in accordance with one or more embodiments.

FIG. 3 depicts an example method for drilling speed and depth computation for downhole tools in accordance with one or more embodiments. For example, the method depicted in FIG. 3 may be practiced using the drilling speed and depth computation tool (200) described in reference to FIGS. 1 and 2 above. In one or more embodiments, one or more of the elements shown in FIG. 3 may be omitted, repeated, and/or performed in a different order. Accordingly, embodiments of drilling speed and depth computation for downhole tools should not be considered limited to the specific arrangements of elements shown in FIG. 3.

Initially in Block 301, a first time based data log and a second time based data log are generated, during a drilling operation, by a first sensor and a second sensor, respectively. Specifically, the first and second sensors are positioned on a bottom hole assembly (BHA) and separated by a known distance. In one or more embodiments, the first sensor and the second sensor are of similar type, such that both of the first and second time based data logs represent a borehole parameter along a drilling trajectory. For example, the first and second sensors may be a neutron imaging senor and an acoustic imaging sensor, respectively, where both the neutron image and acoustic image contain information of borehole diameter along the drilling trajectory.

In Block 302, a time shift is determined by comparing the first time based data log and the second time based data log. In one or more embodiments, the time shift is determined by a computer processor of the BHA and determined during the drilling operation. In one or more embodiments, the time shift is determined such that offsetting the first and second time based data logs by the time shift maximizes a correlation factor of the first and second time based data logs. For example, if both the first and second sensors can detect features in the borehole diameter profile, the time shift is determined by shifting (i.e., offsetting) the time scale of the first time based data log against the second time based data log to match respective peaks representing a protrusion in the borehole surface. Additional examples of determining the time shift are described in reference to FIGS. 4.1-4.6 below.

In Block 303, a drilling speed is determined based on the time shift and the known (i.e., pre-determined) distance between the first sensor and the second sensor. In one or more embodiments, the drilling speed is determined by the computer processor of the BHA during the drilling operation and is referred to as downhole computed drilling speed or downhole drilling speed. For example, the drilling speed may be computed by dividing the known distance between the sensors by the time shift. This represents an average rate of penetration that is averaged over the time period for the drill bit to advance a distance equal to the separation between the sensors. In or more embodiments, the drilling speed is determined within a pre-determined time period from generating the first and second time based data logs. Because the computer processor of the BHA computes the drilling speed without incurring any time delay of sending the data logs to the surface, the pre-determined time period can be a short time period such as a second, a minute, or any time period substantially shorter than the mud pulse telemetry transmission delay to the surface. In this regard, the computed drilling speed is referred to as near-instantaneous speed. Additional details of calculating the drilling speed are described in reference to FIGS. 4.1-4.6 and Equations 1-8 below.

In Blocks 304 and 309, decisions are made as to whether the drill bit is rotating or the weight-on-bit exceeds a pre-determined threshold. For example, a downhole WOB (weight-on-bit) sensor and a drill-string rotation detection sensor (such as gyro, accelerometers, and magnetometers) may be used to make such determination. In one or more embodiments, the depth tracking is stopped when the bit is off bottom (WOB is very low or zero) and/or when the bit is not rotating. Said in other words, if the determination in either Block 304 or Block 309 is no, the method proceeds to Block 308 where the drilling speed is reset to zero before the method continues to Block 305; if the determination in Blocks 304 and 309 are both yes, the method proceeds directly to Block 305 where the drilling speed is mathematically integrated to compute a distance of drill bit penetration over an integration time period. If the BHA does not contain the near-bit WOB sensor, alternatively, only the rotation detection sensor may be used. Also, vibration and shock sensors may alternatively be used to detect drilling and non-drilling status. For example, if the vibration level is less than a predetermined threshold, then the drilling speed may be reset to zero or certain pre-determined level that is substantially zero. In one or more embodiments, this non-drilling-detection feature is used to prevent the tool from accumulating depth tracking errors, to reduce downhole communication bandwidth, memory usage, and computational resources, and/or to yield these precious resources to other features. Accordingly, a depth (referred to as downhole measured depth (MD)) is determined based on a known starting depth and the computed distance of drill bit penetration. For example, the starting depth may be based on a surface MD downlinked (e.g., transmitted via the mud pulse telemetry) to the computer processor of the BHA.

From time to time, errors may accumulate in the downhole MD due to inaccuracies in determining the time shift and integrating the computed drilling speed. In Block 306, the downhole MD is periodically calibrated (i.e., adjusted) based on surface MD. In one or more embodiments, the surface MD is downlinked periodically (e.g., once every hour) and compared with the downhole MD. Any discrepancy between the surface MD and the downhole MD may then be analyzed to determine an error, which is used to correct the downhole MD. Due to the limited bandwidth of downlink (e.g., mud pulse telemetry), the surface MD is available substantially less frequent than the downhole MD. Said in other words, downlinking the surface MD is substantially less frequent than how often the near-instantaneous drilling speed is computed and integrated to compute the downhole MD.

In one or more embodiments, Blocks 305 and 306 may be omitted to control a downhole tool based on drilling speed without computing the depth parameter. In such embodiments, Block 308 or 309 may proceed directly to Block 307 described below.

In Block 307, additional drilling parameters are computed based at least on the drilling speed and/or the downhole MD. For example, the drilling parameters may include build rate, turn rate, dogleg, effective gravity toolface, etc., which can be computed from the drilling speed and/or downhole MD using formulae known to those skilled in the art. These formulae may also use other parameters (e.g., BHA inclination, azimuth, magnetic dip, magnetic toolface, gravity toolface, total magnetic field, total gravity field, etc.) measured using other downhole tools of the BHA. In one or more embodiments, the drilling operation is adjusted based on the downhole drilling speed and/or other computed drilling parameters. For example, a toolface and/or a steering ratio can be adjusted, in real-time, based on at least one of these drilling parameters. In another example, constant depth intervals may be determined based on the downhole drilling speed. Constant depth intervals are time intervals where the drill bit advances a constant depth during each of the intervals. In one or more embodiments, a downhole steerable device is adjusted to control a drilling trajectory periodically based on these constant depth intervals. For example, the downhole steerable device may include a proportional controller, a proportional integral controller, or a proportional integral differential controller that is adjusted once in each of the constant depth intervals. In yet another example, the downhole drilling speed may be used to determine, during the drilling operation, how often to store output of a downhole imaging tool in the downhole memory and/or how often to send output of a downhole imaging tool to the surface unit via mud pulse telemetry. For example, when the drilling speed is slow, the images can be stored downhole or sent to surface less frequently to conserve limited downhole memory capacity and limited mud pulse telemetry bandwidth.

Additional details of computing drilling parameters to control the drilling operation are described in reference to FIGS. 4.1-4.6 and Equations 9-16 below.

FIGS. 4.1-4.11 depict examples of drilling speed and depth computation for downhole tools in accordance with one or more embodiments. For example, the example depicted in FIGS. 4.1-4.11 may be practiced using the drilling speed and depth computation tool (200) described in reference to FIGS. 1 and 2 above.

FIG. 4.1 shows borehole caliper data measured at two different locations in the same BHA. Specifically, borehole diameter information (411) is from a time based data log of RSS caliper data (near-bit mechanical caliper data) and acoustic standoff caliper data obtained with a DNSC (density neutron standoff caliper) tool. In particular, the borehole diameter information (411) is based on near-bit mechanical caliper data from RSS showing a borehole diameter reduction at 0:03:00 on the horizontal time scale. In addition, borehole diameter information (412) is from a time based data log of LWD acoustic standoff caliper tool showing a borehole diameter reduction at 0:11:00 on the same horizontal time scale. The separation between 0:03:00 and 0:11:00 on the horizontal time scale is referred to as the time shift t. The RSS sensor and the LWD sensor are physically positioned on the BHA with a separation distance d. One skilled in the art will appreciate that even though borehole diameter information (411) and borehole diameter information (412) do not agree exactly, the two data log can be shifted (offset) by time t to achieve a match based on a dipping shape indicating the borehole diameter reduction. For example, the borehole might be further opened up or washed out by the mud flow, cuttings, and/or stabilizer contacts, the near-bit RSS caliper (typically measured approximately 2-3 ft away from the drill bit) is generally smaller than or equal to the acoustic caliper readings (typically measured approximately 50-100 ft away from the drill bit). This is an example showing the sensor types with a known separation (d) do not have to be exactly the same to produce a correlation between the resultant data logs. The mechanical caliper at RSS and the acoustic caliper at LWD deploy fundamentally different physics/hardware to measure a similar quantity. Therefore the sensor set does not have to be the same kind, but "similar" kind. Other similar kinds of sensors include those measuring Gamma counts, inclination, azimuth, temperature, formation pressure, caliper, standoff, LWD images, etc.

In the above example, the RSS, MWD, and LWD tool are connected via a common communication bus on the BHA. The communication bus may include EM shorthop as a partial passage. Any other shorthop telemetry within the BHA may be used, including acoustic shorthop communication, mud telemetry shorthop communication, etc. The drilling speed and depth computation tool (200) of FIGS. 1 and 2 may be integrated with the RSS tool, integrated with the LWD tool, or a stand alone tool in the communication bus. In the third case, the drilling speed and depth computation tool (200) may be a bus master that can communicate with both RSS and LWD tools via the communication bus. Further, the drilling speed may be computed by the downhole computer and transmitted via high-speed wired-drill-pipe telemetry to the surface. Then, the downhole drilling speed can be used to obtain more accurate surface-computed depth (measured depth). It is well known that drill pipe can be compressed and stretched and the surface measurement of depth may not be accurate without comparison with downhole computed drilling speed.

FIG. 4.2 shows determining the time shift between two time-based data logs that maximizes a correlation function. Specifically, FIG. 2 shows the Pearson's correlation, r, between the two caliper data sets shown in FIG. 4.1 as a function of an offset, t, in the time scale between the two caliper data sets. As shown in FIG. 4.2, a maximum of the Pearson's correlation, r, between the two caliper data sets occurs when the offset equals 0:08:45 or 525 seconds, which is determined as the time shift using the method shown in FIG. 3 above.

As is known to those skilled in the art, the correlation between two variables reflects the degree to which the variables are related. A common measure of correlation is the Pearson Product Moment Correlation, or Pearson's correlation that reflects the degree of linear relationship between two variables. It ranges from +1 to −1. A correlation of +1 means that there is a perfect positive linear relationship between variables. Equation 1 shows the formula to compute the Pearson's correlation r as a function of the current time T and the time shift t.

$$r_T = \frac{\sum_{t=1}^{N} (X[T] - \overline{X})(Y[T-t] - \overline{Y})}{\sqrt{(X[T] - \overline{X})^2} \sqrt{(Y[T-t] - \overline{Y})^2}}$$

Equation 1

In equation 1, N is the number of data points in each of the time based data logs, X[ ] is an array from time based data log 1 having array elements indexed by t=1 . . . N on the time scale of the data log, Y[ ] is an array from time based data log 2 having array elements indexed by t=1 . . . N on the time scale of the data log, X is a mean value of X[ ], Y is a mean value of Y[ ].

The time shift t that maximizes the Pearson's correlation r is represented in Equation 2.

$$t = \operatorname{argmax}_{t \to N}(r_T)$$

Equation 2

Equations 3-6 are simplified formulae to estimate the time shift t that optimizes (e.g., maximizes) various simplified correlation functions between the two data logs.

$$t = \operatorname{argmax}_{t \to N}(\Sigma_{t=1}^{N}(X[T] \cdot Y[T-t]))$$

Equation 3

Because calculating the Pearson's correlation using equations 1-3 requires computation resources not typically available downhole, the following simplified regression equations are used to find best match between two sensor arrays' data logs considering computing resource limitations of downhole computer.

$$t = \operatorname{argmin}_{t \to N}\left(\frac{\sqrt{\sum_{t=1}^{N}(X[T] - Y[T-t])^2}}{N}\right)$$

Equation 4

$$t = \operatorname{argmin}_{t \to N}\left(\sum_{t=1}^{N}(X[T] - Y[T-t])^2\right)$$

Equation 5

$$t = \operatorname{argmin}_{t \to N}\left(\sum_{t=1}^{N} \operatorname{abs}(X[T] - Y[T-t])\right)$$

Equation 6 where abs( ) is an absolute value operator:

$$|a| = \begin{cases} a, & \text{if } a \geq 0 \\ -a, & \text{if } a < 0. \end{cases}$$

These simplified formulae may be used by the drilling speed and depth computation tool (200) of FIG. 2 or in the method Block 302 of FIG. 3 above. Once the time shift, t, is determined, the near-instantaneous ROP at a given time T can be estimated based on the average drilling speed calculated using Equation 7 below, where d and t are the sensor separation distance and time shift described above.

ROP[T]=d/t            Equation 7

Accordingly, the displacement, Disp, at a given time T can be estimated by mathematically accumulating discrete ROP using Equation 8 below, where t is a time index on the time scale of the data log. Those skilled in the art will appreciate that as the number of data points in the data log increases to a large number, the discrete summation approximates a mathematical integral.

Disp[T]=$\Sigma_{t=0}^{T}$ROP[t]            Equation 8

FIGS. 4.3-4.4 show imaging logs representing RHOB (bulk density) and PE (photo electric), respectively. FIGS. 4.5-4.6 show the standoff images with redundant acoustic sensors on the same BHA. The sensors generating these imaging logs are located with a known separation and created near identical two dimensional images. In this example, each two dimensional image is a collection of 32 one dimensional data logs corresponding to 32 azimuthal angles in the borehole. Those skilled in the art will appreciate that equations 1-6 above can be applicable to multi-dimensional data log considering X[ ] and Y[ ] as multi-dimensional arrays. Also, LWD (or other formation evaluation sensor) data and MWD (or other navigational sensor) data may be both processed at the same time to increase the confidence and accuracy of the drilling speed and/or depth computation.

FIG. 4.7 shows inclination data measured at two different locations in the same BHA, using a RSS sensor and a MWD (navigational) sensor that are physically positioned on the BHA with a separation distance d. One skilled in the art will appreciate that even though first inclination information (Inc1) and second inclination information (Inc2) do not agree exactly, the two data logs can be shifted (offset) by time $t_1$ to achieve a match based on a non-uniform inclination-change. Here, X axis is time or discrete time index and Y axis is inclination in degrees.

FIG. 4.8 shows axial accelerometer data measured at two different locations in the same BHA, using a RSS sensor and a MWD (navigational) sensor that are physically positioned on the BHA with a separation distance d. The axial accelerometer data may be considered an intermediate value to compute borehole inclination and closely related to the inclination change. One skilled in the art will appreciate that even though axial accelerometer information ($G_{z1}$) and axial accelerometer information ($G_{z2}$) do not agree exactly, the two data logs can be shifted (offset) by time $t_1$ to achieve a match based on a non-uniform axial-accelerometer change. Here, X axis is time or discrete time index and Y axis is acceleration in units of G, where 1G=9.8 m/s²

FIG. 4.9 shows azimuth data measured at two different locations in the same BHA, using a RSS sensor and a MWD (navigational) sensor that are physically positioned on the BHA with a separation distance d. One skilled in the art will appreciate that even though first borehole azimuth information (Azi1) and first borehole azimuth information (Azi2) do not agree exactly, the two data logs can be shifted (offset) by time $t_1$ to achieve a match based on a non-uniform azimuth change. Here, X axis is time or discrete time index and Y axis is azimuth in degrees.

FIG. 4.10 shows axial magnetometer data measured at two different locations in the same BHA, using a RSS sensor and a MWD (navigational) sensor that are physically positioned on the BHA with a separation distance d. The axial magnetometer data may be considered an intermediate value to compute borehole azimuth and closely related to the inclination and azimuth change. One skilled in the art will appreciate that even though axial magnetometer information ($B_{z1}$) and axial magnetometer information ($B_{z2}$) do not agree exactly, the two data logs can be shifted (offset) by time $t_1$ to achieve a match based on a non-uniform axial magnetometer reading change. Here, X axis is time or discrete time index and Y axis is magnetic field strength in gauss.

FIG. 4.11 shows total magnetic field (TMF) data measured at two different locations in the same BHA, where magnetic interference is present (e.g. from the near-by casing, etc.), using a RSS sensor and a MWD (navigational) sensor that are physically positioned on the BHA with a separation distance d. One skilled in the art will appreciate that even though borehole TMF information in the two data logs do not agree exactly, the two data logs can be shifted (offset) by time $t_1$ to achieve a match based on a non-uniform TMF shape. Here, X axis is time or discrete time index and Y axis is magnetic field strength in gauss.

As shown in the example scenarios above, the drilling speed and depth computation tool (200) of FIG. 2 or the method of FIG. 3 makes use of the existing sensor sets (e.g., RSS mechanical caliper vs. LWD acoustic standoff data, RSS [azimuthal] gamma vs. LWD/MWD [azimuthal] gamma data, RSS survey data vs. MWD survey data, etc.) on the BHA and does not require any additional dedicated sensor sets and/or dedicated mechanical components (magnetizers and/ or counter wheels). With a downhole software revision, the LWD sub can be used for dual purposes, namely (1) a LWD imaging sensor, and (2) a dedicated ROP calculator.

Once downhole ROP is obtained in the example above, the proportional gain of the automated RSS trajectory control system may be adjusted based on the drilling speed. Also, by combining the computed depth with the RSS survey data (near-bit inclination and azimuth), the RSS computer may be able to compute accurate well positions downhole. Further, the logging speed and telemetry speed (data update frequency) may be modified depending upon the computed ROP. Overall, by knowing ROP downhole, the quality of Downhole Steering Automation (e.g., used with rotary-steerable systems) can be improved as illustrated by the examples below.

Downhole Computed Depth

The (drill string or measured) depth (denoted as "Depth") at a given time T can be updated with the displacement at a given time T as shown in Equation 9 and is referred to as downhole computed depth or downhole measure depth (MD).

$$\text{Depth}[T] = \text{Depth}[T-1] + \text{Disp}[T] \quad \text{Equation 9}$$

Further, downhole MD may be periodically synchronized (updated) with the surface MD in order to avoid error accumulation. This synchronization can be done, for example, by downlinking the surface MD to the downhole tool periodically (e.g., every hour, or every 200 feet, etc). Also, this correlation-based ROP and depth computation method may be combined with other known methods, such as with downhole counter wheels, accelerometer-based methods, and so on.

Real-Time Survey During the Drilling Operation

One effective use of the downhole MD is to determine the turn and build rate of a directional drilling system downhole in real time. This is especially useful if a downhole tool is continuously adjusting toolface and steering ratio in order to obtain a desired directional drilling response characterized by the build rate, turn rate, dogleg, and effective gravity toolface, which can be computed using Equations 10-14 below, where D is an intermediate value for calculating Dogleg.

$$BuildRate = (Inc[T] - Inc\{T-t\})/(\text{Depth}[T] - \text{Depth}[T-t]) \quad \text{Equation 10}$$

$$TurnRate = (Azi[T] - Azi\{T-t\})/(\text{Depth}[T] - \text{Depth}[T-t]) \quad \text{Equation 11}$$

$$D = \quad \text{Equation 12}$$
$$\arccos[\cos(Azi[T] - Azi[T-t])\sin(Inc[T-t])\sin(Inc[T]) + \cos(Inc[T])\cos(Inc[T-t])]$$

$$Dogleg = D/(\text{Depth}[T] - \text{Depth}[T-t]) \quad \text{Equation 13}$$

$$GravityToolFace = \quad \text{Equation 14}$$
$$\arccos[(\cos(D)\cos(Inc[T-t]) - \cos(Inc[T]))/\sin(Inc[T-t])\sin(D)]$$

Or $$BuildRate = \frac{Inc2 - Inc1}{d}$$

$$TurnRate = \frac{Azi2 - Azi1}{d}$$

$$Inc1 = \arctan\left(\frac{\sqrt{Gx1^2 + Gy1^2}}{Gz1}\right)$$

$$Inc2 = \arctan\left(\frac{\sqrt{Gx2^2 + Gy^2}}{Gz2}\right)$$

$$Azi1 = \arctan\left(\frac{(Gx1 * By1 - Gy1 * Bx1) * \sqrt{Gx1^2 + Gy1^2 + Gz1^2}}{Bz1 * (Gx1^2 + Gy1^2) - Gz1 * \binom{Gx1 * Bx1 -}{Gy1 * By1}}\right)$$

$$Azi2 = \arctan\left[\frac{(Gx2*By2 - Gy2*Bx2)*\sqrt{Gx2^2 + Gy2^2 + Gz2^2}}{Bz2*(Gx2^2 + Gy2^2) - Gz2*\left(\begin{array}{c}Gx2*Bx2 - \\ Gy2*By2\end{array}\right)}\right]$$

$$ToolFace = \arccos\left[\frac{\cos(Inc1)\cos(D) - \cos(Inc2)}{\sin(Iinc1)\sin(D)}\right]$$

$$DogLeg = \frac{D}{d}$$

where:

$$D = \arccos\left[\frac{\cos(Azi2 - Azi1)\sin(Inc1)}{\sin(Inc2) + \cos(Inc1)\cos(Inc2)}\right]$$

In these equivalent equations, Inc1 is the inclination of the well at a first measured depth (MD1), Inc2 is the inclination of the well at a second measured depth (MD2), Azi1 is the inclination of the well at MD1 and Azi2 is the inclination of the well at MD2, Gx1, Gy1, and Gz1 are the x-, y-, and z-axis accelerometer readings, respectively at MD1, Gx2, Gy2, and Gz2 are the x-, y-, and z-axis accelerometer readings, respectively at MD2, Bx1, By1, and Bz1 are the x-, y- and z-axis magnetometer readings respectively at MD1, Bx2, By2, and Bz2 are the x-, y- and z-axis magnetometer readings respectively at MD2. For example, MD1 and MD2 may correspond to two sensor locations at any particular time point during the drilling operation.

Typically, three magnetometers and three accelerometers are used to measure the three components of the gravity vector and the earth magnetic field vector in the sensor frame. The voltage outputs from the accelerometers are denoted by Gx, Gy and Gz, corresponding to the three orthogonal axes. Similarly the magnetometer outputs are Bx, By and Bz. In particular, z axis points down the axis of the tool and the y axis is defined as being in line with the toolface.

Build rate and turn rate may be computed from time-domain data using Equations 10 and 11 or alternatively from depth domain data using the equivalent equations based on data at MD1 and MD2.

In order to accomplish the directional drilling task, the operator needs to know the orientation of the bent section (i.e., in the rotary-steerable BHA). The relationship between the directional sensor and the bent section is fixed for each bottom hole assembly. From the directional sensor measurement, the directional sensor tool face is known. If the angular difference between the directional sensor reference point and the bent section is measured, then the operator can use this measurement and the directional sensor tool face reading to determine the orientation of the bent section.

Closed-Loop Gain Control

A common challenge in the automated steering of a downhole steerable device (e.g., RSS) is that the downhole computer generally does not know the drilling speed. As a result, the proportional controller (e.g., the gain) is not properly adjusted. If the downhole computer is able to compute (or given) the current drilling speed (e.g. ROP), it can effectively adjust the gain of the proportional controller used for the Inclination and/or Azimuth Hold algorithm. In the Inclination and/or Azimuth Hold, the build rate (BR) and turn rate (TR) are computed in the equations 15 and 16 below.

$$BR = Kbr*ROP*(\Delta Inc) + DropTendency \quad \text{Equation 15}$$

$$TR = Ktr*ROP*(\Delta Azi) + WalkTendency \quad \text{Equation 16}$$

In Equations 15 and 16, Kbr is the proportional controller gain for build rate control, Ktr is the proportional controller gain for turn rate control, ROP is the downhole computed drilling speed, ΔInc is the difference between Target Inclination and Actual Inclination, ΔAzi is the difference between Target Azimuth and Actual Azimuth, DropTendency is the drop tendency of the bit/BHA, and WalkTendency is the walk tendency of the bit/BHA, as these terms are understood by one skilled in the art. Although only proportional gains are adjusted in the above example, those skilled in the art, with the benefit of this disclosure will appreciate that the same concept is equally applicable to integral gains, differential gains, etc. These equations are used when the control of the steerable tool occurs at the fixed time interval and the gain is adjusted at the fixed time interval based on the drilling speed. Alternatively, the control of the steerable tool may occur at the fixed depth interval without substantially changing the gains of the controller(s) based on the drilling speed.

Based on the BR and TR computed above, desired toolface and steering ratio (proportion) may be computed using the following equations. DropTendency and WalkTendency are assumed to be zero for clarity and simplicity.

$$BR = Kbr*ROP*(\Delta Inc)$$

$$TR = Ktr*ROP*(\Delta Azi)$$

Desired Toolface=arc tan 2(TR, BR)

Desired Proportion=sqrt((TR)$^2$+(BR)$^2$)

where ΔInc=Target Inc−Actual Inc

ΔAzi=Target Azi−Actual Azi

Accordingly, the desired toolface and proportion are set in the steerable tool to control the direction of the drilling course. Given the drilling speed, the RSS is able to achieve its trajectory control in an improved manner. Those skilled in the art, with the benefit of this disclosure, will appreciate that above equations and control scheme are equally applicable to Vertical Drilling, Magnetic Kickoff, Constant Curvature Drilling (Constant Build and/or Turn), and Tangent and Horizontal Drilling automation schemes.

LWD Recording Interval

The modern LWD imaging tool requires high-density, high-capacity downhole memory to generate high-quality LWD image logs after the drilling run (memory-based images). However, knowing the drilling speed (ROP) of the steering device, the LWD imaging tool may be able to conserve memory resource and intelligently manage its memory usage. For example, if the drilling becomes slower, the tool does not have to record the image data in memory as frequently as when it drills faster.

The similar principle applies to the use of the bandwidth of the mud pulse telemetry. When the drilling becomes very slow, the LWD image data does not have to be pulsed up as frequently therefore, it can yield the telemetry bandwidth to other tools.

Figure 5:
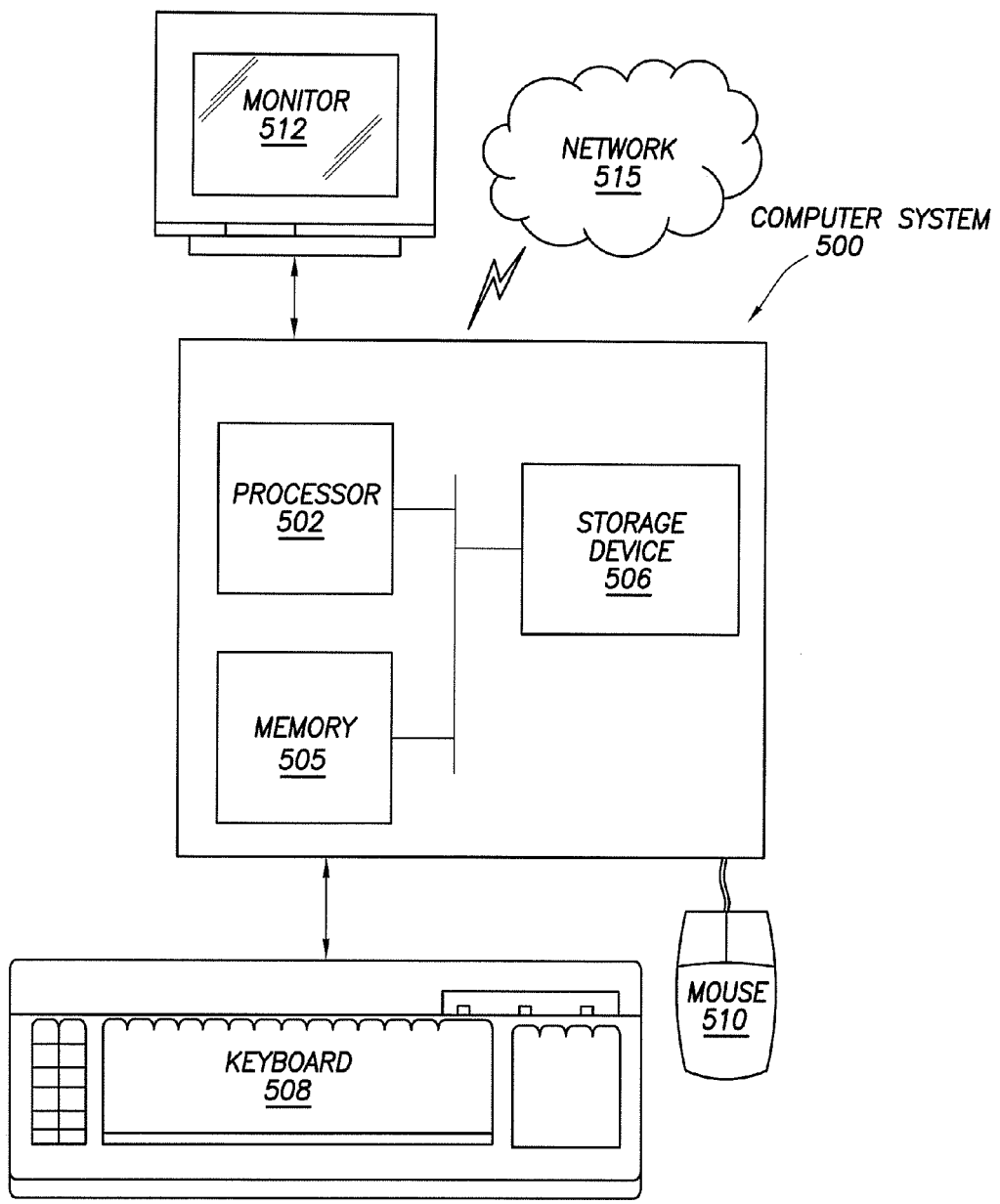
FIG. 5 depicts a computer system using which one or more embodiments of drilling speed and depth computation for downhole tools may be implemented.

Embodiments of drilling speed and depth computation for downhole tools may be implemented on virtually any type of computer regardless of the platform being used. For instance, as shown in FIG. 5, a computer system (500) includes one or more processor(s) (502) such as a central processing unit (CPU) or other hardware processor, associated memory (505) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display LCD, a plasma display, or cathode ray tube (CRT) monitor). The computer system (500) may be connected to a network (515) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (500) includes at least the minimal processing, input, and/or output means necessary to practice one or more embodiments.

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

Drilling speed and depth computation for downhole tools has been described with respect to a limited number of embodiments, those skilled in the art, having benefit of this disclosure, will appreciate that other embodiments may be devised which do not depart from the scope of drilling speed and depth computation for downhole tools as disclosed herein. For example, equations listed throughout this disclosure may be solved using software, firmware, FPGA (Field-Programmable Gate Array), hardware (e.g., including analog or digital circuits), or combinations thereof. Accordingly, the scope of drilling speed and depth computation for downhole tools should be limited only by the attached claims.

What is claimed is:

1. A method for managing a drilling operation in a subterranean formation, comprising:
generating, by a first sensor of a bottom hole assembly (BHA) and during the drilling operation, a first time based data log representing a borehole parameter along a drilling trajectory;
generating, by a second sensor of the BHA during the drilling operation, a second time based data log representing the borehole parameter along the drilling trajectory;
determining, by a computer processor of the BHA and during the drilling operation, a time shift by comparing the first time based data log and the second time based data log, wherein offsetting the first and second time based data logs by the time shift maximizes a correlation factor of the first and second time based data logs;
determining, within a pre-determined time period from generating the first and second time based data logs, a drilling speed based on the time shift and a pre-determined distance between the first sensor and the second sensor; and
performing the drilling operation based on the drilling speed.

2. The method of claim 1, further comprising:
calculating, by the computer processor of the BHA and during the drilling operation, a difference between the first and second time based data logs based on X[T] and Y[T−t],
wherein the correlation factor is inversely proportional to the difference, and
wherein the time shift is determined based on at least one selected from a group consisting of $$t = \mathrm{argmin}_{t \to N}\left(\frac{\sqrt{\sum_{t=1}^{N}(X[T]-Y[T-t])^2}}{N}\right),$$

$$t = \mathrm{argmin}_{t \to N}\left(\sum_{t=1}^{N}(X[T]-Y[T-t])^2\right), \text{ and}$$

$$t = \mathrm{argmin}_{t \to N}\left(\sum_{t=1}^{N}\mathrm{abs}(X[T]-Y[T-t])\right),$$

where Σ represents a summation over N time points in the first time based data log, T represents one of the N time points, t represents the time shift, X[T] represents a first normalized value of the first time based data log at T, and Y[T−t] represents a second normalized value of the second time based data log at T−t.

3. The method of claim 1, further comprising:
dividing, by the computer processor of the BHA and within the pre-determined time period, the pre-determined distance over the time shift to determine the drilling speed;
resetting, by the computer processor of the BHA and within the pre-determined time period, the drilling speed to a pre-determined level in response to determining a vibration level of the BHA being less than a pre-determined threshold; and
determining, by the computer processor of the BHA and within the pre-determined time period, a drilling depth by at least mathematically integrating the drilling speed over time.

4. The method of claim 1, further comprising:
calculating, by the computer processor of the BHA and within the pre-determined time period, at least one drilling parameter selected from a group consisting of build rate, turn rate, dogleg, and effective gravity toolface based on the drilling speed; and
adjusting, within a pre-determined time period from generating the first and second time based data logs, at least one selected from a group consisting of a toolface and a steering ratio based on the at least one drilling parameter.

5. The method of claim 1, further comprising:
determining, during the drilling operation, a plurality of constant depth intervals based on the drilling speed; and
adjusting, at the plurality of constant depth intervals, a gain of at least one selected from a group consisting of a proportional controller, a proportional integral controller, and a proportional integral differential controller of a downhole steerable device to control a trajectory thereof.

6. The method of claim 1, further comprising:
determining, based on the drilling speed, a frequency for at least one selected from a group consisting of storing output of a downhole imaging tool in a downhole memory of the BHA and sending the output of the downhole imaging tool to a surface unit via mud pulse telemetry.

7. The method of claim 1, further comprising:
transmitting the drilling speed to a surface unit,
wherein the drilling speed is compared, in the surface unit, to a surface-determined drilling speed for calibration.

8. The method of claim 1,
wherein the first sensor and the second sensor comprise at least one selected from a group consisting of a formation evaluation sensor, a navigation sensor, a logging-while-drilling (LWD) sensor, a fluid sampling sensor, a pressure sensor, a temperature sensor, a downhole camera, and a caliper sensor, and
wherein the first time based data log and the second time based data log comprise at least one selected from a group consisting of first time based data log one-dimensional data array, a multi-dimensional data array, azimuthal data, and imaging data.

9. The method of claim 1, further comprising:
generating, by a third sensor of the BHA and during the drilling operation, a third time based data log representing another borehole parameter along the drilling trajectory;
generating, by a fourth sensor of the BHA during the drilling operation, a fourth time based data log representing the another borehole parameter along the drilling trajectory;
determining, by a computer processor of the BHA and during the drilling operation, another time shift by comparing the third time based data log and the fourth time based data log, wherein offsetting the third and fourth time based data logs by the another time shift maximizes another correlation factor of the third and fourth time based data logs; and
validating the drilling speed based on the another time shift and another pre-determined distance between the third sensor and the fourth sensor,
wherein the first sensor and the second sensor, comprise a formation evaluation sensor, and
wherein the third sensor and the fourth sensor comprise a navigational sensor.

10. A bottom hole assembly (BHA), comprising:
a first sensor configured to generate, during a drilling operation, a first time based data log representing a borehole parameter along a drilling trajectory;
a second sensor configured to generate, during the drilling operation, a second time based data log representing the borehole parameter along the drilling trajectory; and
a drilling speed calculator configured to:
determine, during the drilling operation, a time shift by comparing the first time based data log and the second time based data log, wherein offsetting the first and second time based data logs by the time shift maximizes a correlation factor of the first and second time based data logs; and
determine, within a pre-determined time period from generating the first and second time based data logs, a drilling speed based on the time shift and a pre-determined distance between the first sensor and the second sensor,
wherein the drilling operation is performed based on the drilling speed.

11. The BHA of claim 10, the drilling speed calculator further configured to:
calculate, during the drilling operation, a difference between the first and second time based data logs based on X[T]−Y[T−t],
wherein the correlation factor is inversely proportional to the difference, and
wherein the time shift is determined based on at least one selected from a group consisting of $$t = \operatorname{argmin}_{t \to N}\left(\sqrt{\frac{\sum_{t=1}^{N}(X[T]-Y[T-t])^2}{N}}\right),$$

$$t = \operatorname{argmin}_{t \to N}\left(\sum_{t=1}^{N}(X[T]-Y[T-t])^2\right), \text{ and}$$

$$t = \operatorname{argmin}_{t \to N}\left(\sum_{t=1}^{N}\operatorname{abs}(X[T]-Y[T-t])\right),$$

where Σ represents a summation over N time points in the first time based data log, T represents one of the N time points, t represents the time shift, X[T] represents a first normalized value of the first time based data log at T, and Y[T−t] represents a second normalized value of the second time based data log at T−t.

12. The BHA of claim 10, the drilling speed calculator further configured to:
divide, within the pre-determined time period, the pre-determined distance over the time shift to determine the drilling speed;
reset, within the pre-determined time period, the drilling speed to a pre-determined level in response to determining a vibration level of the BHA being less than a pre-determined threshold; and
determine, within the pre-determined time period, a drilling depth by at least mathematically integrating the drilling speed over time.

13. The BHA of claim 10, further comprising a drilling parameter calculator configured to:
calculate, within the pre-determined time period, at least one drilling parameter selected from a group consisting of build rate, turn rate, dogleg, and effective gravity toolface based on the drilling speed,
wherein at least one selected from a group consisting of a toolface and a steering ratio is adjusted, within a pre-determined time period from generating the first and second time based data logs, based on the at least one drilling parameter.

14. The BHA of claim 10, further comprising a drilling parameter calculator configured to:
determine, during the drilling operation, a plurality of constant depth intervals based on the drilling speed,
wherein a gain of at least one selected from a group consisting of a proportional controller, a proportional integral controller, and a proportional integral differential controller of a downhole steerable device is adjusted to control a trajectory thereof at the plurality of constant depth intervals.

15. The BHA of claim 10, further comprising a drilling parameter calculator configured to:
determine, based on the drilling speed, a frequency for at least one selected from a group consisting of storing output of a downhole imaging tool in a downhole memory of the BHA and sending the output of the downhole imaging tool to a surface unit via mud pulse telemetry.

16. The BHA of claim 10, the drilling speed calculator further configured to:
    transmit the drilling speed to a surface unit,
    wherein the drilling speed is compared, in the surface unit, to a surface-determined drilling speed for calibration.

17. The BHA of claim 10,
    wherein the first sensor and the second sensor comprise at least one selected from a group consisting of a formation evaluation sensor, a navigation sensor, a logging-while-drilling (LWD) sensor, a fluid sampling sensor, a pressure sensor, a temperature sensor, a downhole camera, and a caliper sensor, and
    wherein the first time based data log and the second time based data log comprise at least one selected from a group consisting of first time based data log one-dimensional data array, a multi-dimensional data array, azimuthal data, and imaging data.

18. The BHA of claim 10, further comprising:
    a third sensor configured to generate, during the drilling operation, a third time based data log representing another borehole parameter along the drilling trajectory; and
    a fourth sensor configured to generate, during the drilling operation, a fourth time based data log representing the another borehole parameter along the drilling trajectory,
    the drilling speed calculator further configured to:
        validate the drilling speed based on the another time shift and another pre-determined distance between the third sensor and the fourth sensor,
    wherein the first sensor and the second sensor comprise a formation evaluation sensor, and
    wherein the third sensor and the fourth sensor comprise a navigational sensor.

19. A non-transitory computer readable medium storing instructions for managing drilling operation in a subterranean formation, the instructions when executed causing a processor of a bottom hole assembly (BHA) to:
    generate, by a first sensor of the BHA and during the drilling operation, a first time based data log representing a borehole parameter along a drilling trajectory;
    generate, by a second sensor of the BHA during the drilling operation, a second time based data log representing the borehole parameter along the drilling trajectory;
    determine, during the drilling operation, a time shift by comparing the first time based data log and the second time based data log, wherein offsetting the first and second time based data logs by the time shift maximizes a correlation factor of the first and second time based data logs;
    determine, within a pre-determined time period from generating the first and second time based data logs, a drilling speed based on the time shift and a pre-determined distance between the first sensor and the second sensor; and
    perform the drilling operation based on the drilling speed.

20. The non-transitory computer readable medium of claim 19, the instructions when executed further causing the processor of the BHA to:
    calculate, during the drilling operation, a difference between the first and second time based data logs based on $X[T]$ and $Y[T-t]$,
    wherein the correlation factor is inversely proportional to the difference, and
    wherein the time shift is determined based on at least one selected from a group consisting of $$t = \mathrm{argmin}_{t \to N}\left(\sqrt{\frac{\sum_{t=1}^{N}(X[T]-Y[T-t])^2}{N}}\right),$$

$$t = \mathrm{argmin}_{t \to N}\left(\sum_{t=1}^{N}(X[T]-Y[T-t])^2\right), \text{ and}$$

$$t = \mathrm{argmin}_{t \to N}\left(\sum_{t=1}^{N}\mathrm{abs}(X[T]-Y[T-t])\right),$$

where $\Sigma$ represents a summation over N time points in the first time based data log, T represents one of the N time points, t represents the time shift, $X[T]$ represents a first normalized value of the first time based data log at T, and $Y[T-t]$ represents a second normalized value of the second time based data log at T−t.

* * * * *